United States Patent
Soler Balcells

(10) Patent No.: US 10,525,612 B2
(45) Date of Patent: Jan. 7, 2020

(54) SET SQUARE FOR MANUAL CERAMIC CUTTER

(71) Applicant: GERMANS BOADA, S.A., Rubi (Barcelona) (ES)

(72) Inventor: Jordi Soler Balcells, Rubi (ES)

(73) Assignee: GERMANS BOADA, S.A., Rubi (Barcelona) (ES)

( * ) Notice: Subject to any disclaimer, the term of this patent is extended or adjusted under 35 U.S.C. 154(b) by 150 days.

(21) Appl. No.: 15/559,723

(22) PCT Filed: Feb. 17, 2016

(86) PCT No.: PCT/ES2016/070100
§ 371 (c)(1),
(2) Date: Sep. 19, 2017

(87) PCT Pub. No.: WO2016/151163
PCT Pub. Date: Sep. 29, 2016

(65) Prior Publication Data
US 2018/0043573 A1    Feb. 15, 2018

(30) Foreign Application Priority Data
Mar. 20, 2015    (ES) .................................. 201500226

(51) Int. Cl.
*B28D 7/00* (2006.01)
*B28D 7/04* (2006.01)
(Continued)

(52) U.S. Cl.
CPC .............. *B28D 7/00* (2013.01); *B28D 1/225* (2013.01); *B28D 7/04* (2013.01); *B43L 7/027* (2013.01); *G01B 3/04* (2013.01)

(58) Field of Classification Search
CPC .......... B28D 7/00; B43L 7/027; B43L 13/043
(Continued)

(56) References Cited

U.S. PATENT DOCUMENTS

| | | | | |
|---|---|---|---|---|
| 855,916 | A | * | 6/1907 | Werner ................. B43L 13/048 192/93 A |
| 1,115,333 | A | * | 10/1914 | Pease ...................... C03B 33/10 33/32.1 |

(Continued)

FOREIGN PATENT DOCUMENTS

| | | |
|---|---|---|
| CN | 203542873 U | 4/2014 |
| ES | 1040704 U | 5/1999 |

(Continued)

OTHER PUBLICATIONS

International Search Report dated Apr. 8, 2016 of corresponding International application No. PCT/ES2016/070100; 6 pgs.

*Primary Examiner* — Christopher W Fulton
(74) *Attorney, Agent, or Firm* — Maier & Maier, PLLC

(57) ABSTRACT

A set square for manual ceramic cutters, including a ruler intended to be rotatably mounted and secured to a base of a manual ceramic cutter, defining various angles; a stop that is mounted on the ruler and can be moved longitudinally; and a tightening element for securing to the ruler. The cross-section of the ruler includes two oblique planes that converge towards an intermediate surface provided with a longitudinal recess having a generally T-shaped cross section, for mounting the tightening element. The lateral stop includes two oblique planes facing the ruler and having the same slope as the oblique planes of the ruler, and which converge towards an intermediate surface that has an opening to mount the tightening element.

4 Claims, 4 Drawing Sheets

(51) Int. Cl.
  *B43L 7/027* (2006.01)
  *B28D 1/22* (2006.01)
  *G01B 3/04* (2006.01)

(58) Field of Classification Search
  USPC .................................................. 33/474, 437
  See application file for complete search history.

(56) References Cited

U.S. PATENT DOCUMENTS

| | | | | |
|---|---|---|---|---|
| 1,142,368 A | * | 6/1915 | Row | B43L 13/08 33/438 |
| 2,501,296 A | * | 3/1950 | Tyler | B43L 13/048 33/427 |
| 3,273,246 A | * | 9/1966 | Siberini | G01B 3/56 33/470 |
| 4,102,050 A | * | 7/1978 | Roth | B43L 13/048 33/437 |
| 4,383,375 A | * | 5/1983 | Avella | B43L 13/045 33/430 |
| 4,403,423 A | * | 9/1983 | Ford | B43L 13/205 33/432 |
| 4,882,846 A | * | 11/1989 | Reed | E04F 21/26 33/464 |
| 5,062,213 A | * | 11/1991 | Kolesky | B43L 7/02 33/427 |
| 5,269,212 A | * | 12/1993 | Peters | B26D 1/045 83/455 |
| 6,324,766 B1 | * | 12/2001 | Schooley | B26B 29/06 33/42 |
| 2010/0269812 A1 | * | 10/2010 | Torrents I Comas | B28D 1/225 125/23.01 |

FOREIGN PATENT DOCUMENTS

| | | |
|---|---|---|
| ES | 1070460 U | 9/2009 |
| FR | 2756208 A1 | 5/1998 |

* cited by examiner

SET SQUARE FOR MANUAL CERAMIC CUTTER

OBJECT OF THE INVENTION

The object of the present invention is a set square for manual ceramic cutters of the type that comprises a ruler intended to be rotatably mounted and secured to a base of a ceramic cutter, defining various angles; a lateral stop that is mounted on the ruler and can be moved longitudinally and a tightening element for securing the lateral stop to the ruler.

This invention has particular characteristics intended to improve securing of the lateral stop to the ruler and using the set square to fasten small ceramic parts.

FIELD OF APPLICATION OF THE INVENTION

This invention is applicable to manual ceramic cutters.

STATE OF THE ART

Currently, manual ceramic cutters having a base with a surface to support the ceramic parts to be cut; a longitudinal guide for the movement of a toolholder head provided with a handle and a cutting tool, and a tool for separating the ceramic parts previously scored with said cutting tool are known.

It is also known that these manual ceramic cutters have, on one of the ends of the base, a set square mounted on a rotary shaft, which can be fixed to form different angles with the longitudinal mid-plane of the base and, as a result, with the line scored on the ceramic parts by the cutting tool.

The purpose of said set square is to form a front stop and a lateral stop for the ceramic part to be cut.

Some examples of manual ceramic cutters provided with a set square to support the ceramic parts to be cut are described, for example, in the utility models ES1070460U and ES1040704U, both of the same applicant of the present invention.

One of the objectives of the manufacturers of these types of manual cutters is to develop means of fastening the lateral stop to the ruler that minimize the possibility of movement between both elements, establishing moderate tightening. The applicant of the invention is unaware of the existence of prior art that provides an effective solution to this problem.

DESCRIPTION OF THE INVENTION

The set square for manual ceramic cutters is the object of this invention, comprising: a ruler attached to a platform intended to be rotatably mounted and secured to a base of a manual ceramic cutter; a lateral stop that is mounted on the ruler and can be moved longitudinally; and a tightening element for securing the lateral stop to the ruler; has characteristics intended to ensure secure fastening of the lateral stop to the ruler, applying a reduced force on both.

To do so, and according to the invention, the cross-section of the ruler comprises two oblique planes that extend along the ruler and end in an intermediate surface provided with a longitudinal recess having a generally T-shaped cross section, in which the tightening element is mounted; the lateral stop on a surface facing the ruler comprising two oblique planes, parallel to the oblique planes of the ruler, and which converge towards an intermediate surface that has an opening for mounting the tightening element.

The intermediate surface of the lateral stop has a width smaller than the intermediate surface of the ruler, which ensures that upon actuating the tightening element, the oblique planes of the lateral stop directly act on the respective oblique planes, ensuring the self-centering and immobilization thereof in the mounting position.

The tightening element comprises a threaded rod that has on one end, a head housed in the longitudinal recess of the ruler and on the other end, a nut or a tightening knob.

In this invention, it is also provided that the lateral stop comprises a body formed by a first carrier section of the aforementioned oblique planes in contact with the ruler, and a second section, articulated on the previous one by means of a rotary shaft with the aim of facilitating the actuation of the stop on the ceramic parts to be cut, especially when they are small.

DESCRIPTION OF THE FIGURES

As a complement to the description provided herein, and for the purpose of helping to make the characteristics of the invention more readily understandable, the present specification is accompanied by a set of drawings, which, by way of illustration and not limitation, represent the following.

PREFERRED EMBODIMENT OF THE INVENTION

Figure 1:
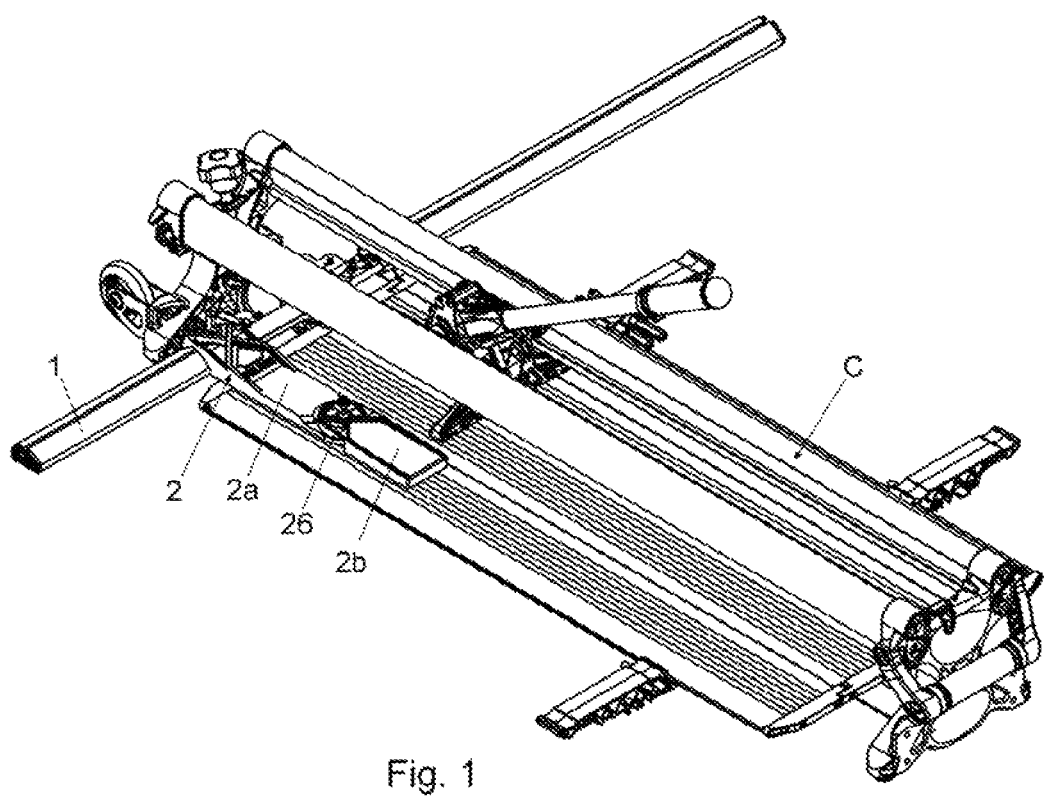
FIG. 1 shows a perspective view of an exemplary embodiment of the set square according to the invention mounted on a manual ceramic cutter.

In the exemplary embodiment shown in FIG. 1, the set square of the invention is shown mounted on a manual ceramic cutter is shown in its entirety as "C".

The set square is made up of a ruler (1), a lateral stop (2) mounted on it which can be moved longitudinally, and a tightening element (3) for securing the lateral stop (2) in the desired position along the ruler (1).

Figure 2:
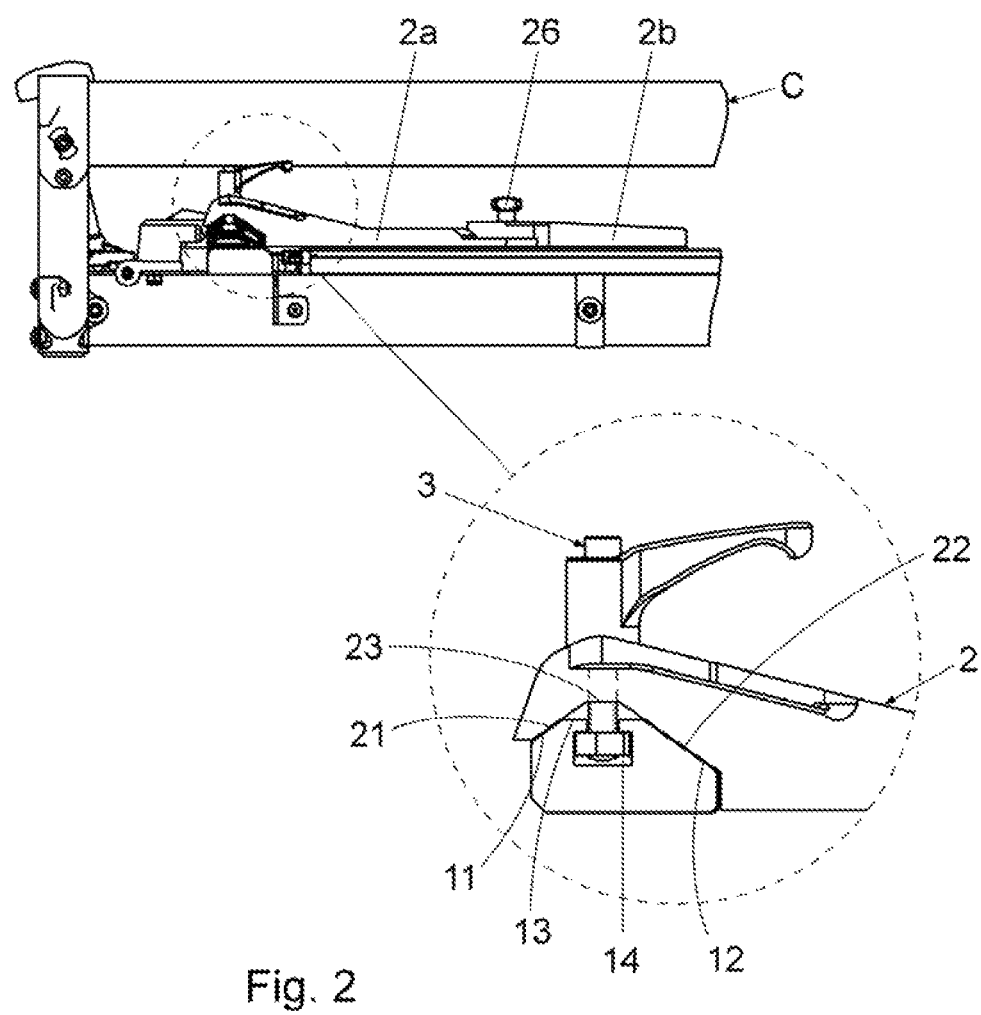
FIG. 2 shows a partial elevation view of the cutter of the previous figure, in which the mounting of the lateral stop on the ruler of the set square and a detailed enlargement of the coupling zone of both parts can be observed.
Figure 3:
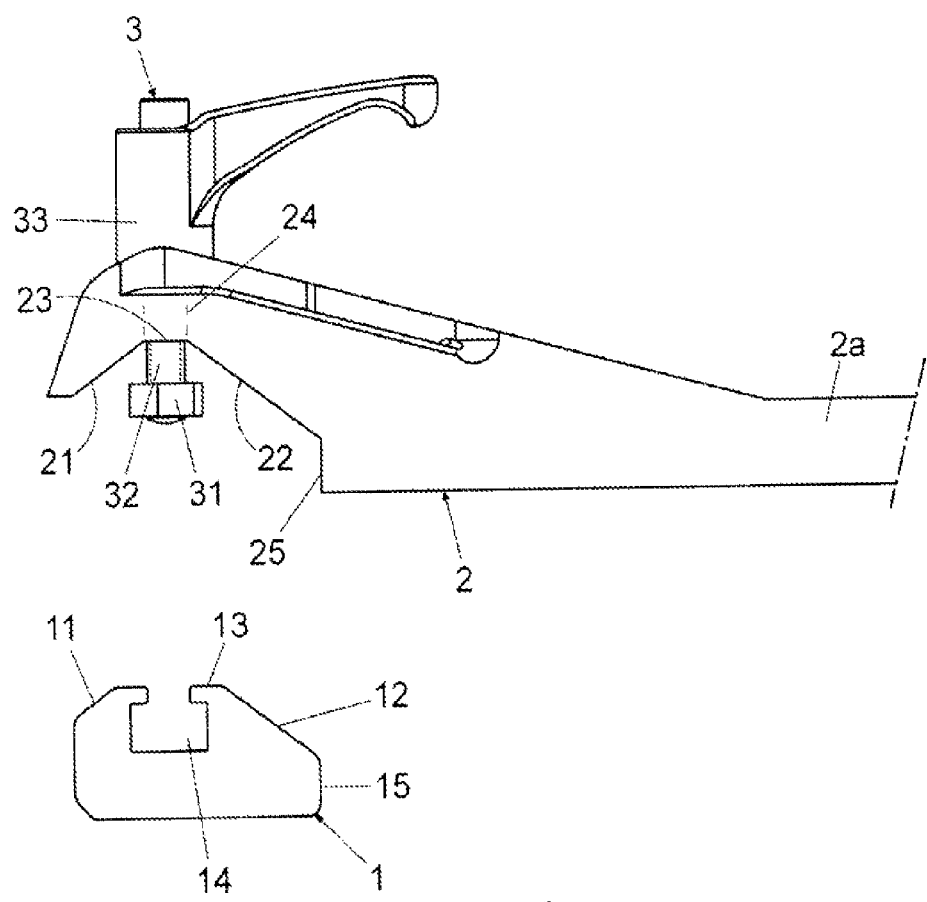
FIG. 3 shows the previous figure in detail at a larger scale and with the lateral stop dismounted from the ruler.

As shown in FIGS. 2 and 3, the cross-section of the ruler (1) comprises two oblique planes (11, 12) that converge towards an intermediate surface (13) facing in this case the upper zone and provided with a longitudinal recess (14) having a generally T-shaped cross section for mounting the tightening element (3).

Moreover, the lateral stop (2) comprises two oblique planes (21, 22) facing the ruler (1) and having the same slope as the oblique planes (11, 12) of the ruler (1), and which converge towards an intermediate surface (23) of a width smaller than the intermediate surface (13) of the ruler (1), such that contact between the ruler (1) and the lateral stop is established by means of the oblique planes (11, 12) and (21, 22), respectively.

The lateral stop (2) has on the intermediate surface (23) a hole (24) to mount the tightening element (3), which comprises a head (31) that is housed and can be moved and not rotated in the longitudinal recess (14) of the ruler (1), a threaded rod (32) that passes through the hole (24) of the lateral stop (2), and a tightening knob (33) mounted on said threaded rod.

The actuation of the oblique planes (21, 22) of the lateral stop (2) on the oblique planes (11, 12) of the ruler (1) ensures that upon actuating the tightening element (3), the contact zones of the ruler and the lateral stop center themselves, thus preventing said lateral stop from moving in all directions.

In the example shown in the figures, one of the oblique planes of the ruler (1) is spread along a plane (15) parallel to the shaft of the tightening element (3) and is extended along the ruler (1); one of the oblique planes of the lateral stop being spread on a plane (25) that, in the securing position of the stop (2) to the ruler, it is arranged in parallel and very close to the plane (15) of the ruler, preventing the relative rotation thereof.

Figure 4:
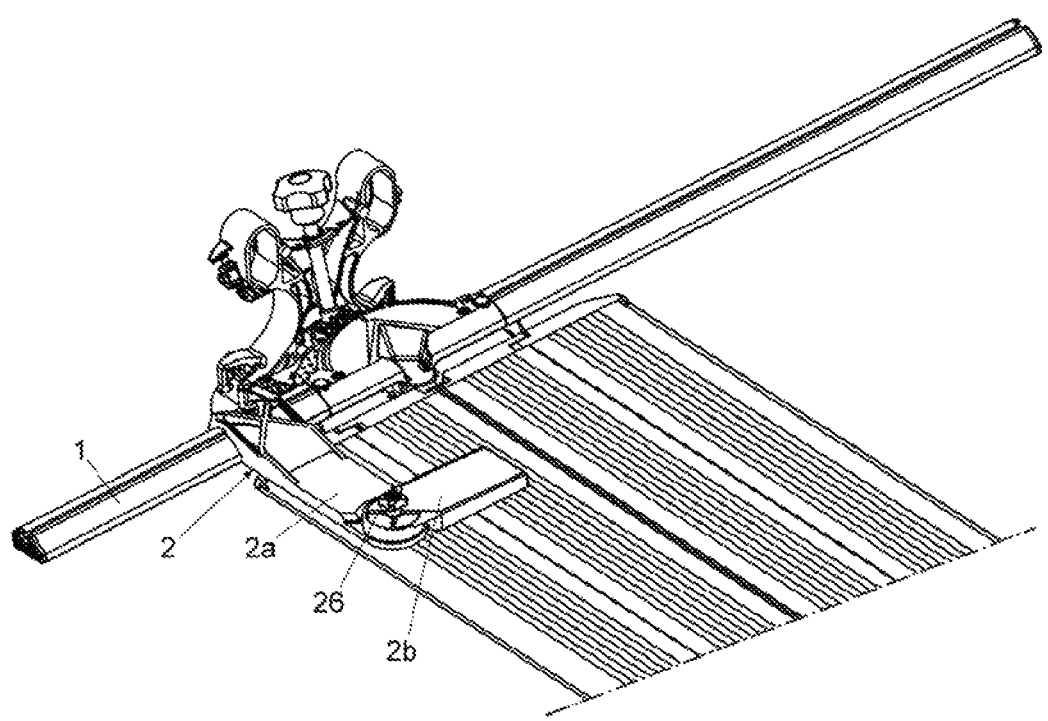
FIG. 4 shows a perspective view of the set square mounted on a manual ceramic cutter, with the lateral stop articulated by the intermediate rotary shaft.

In the example shown, the lateral stop (2) has a first section (2a) that defines the aforementioned oblique planes (21, 22) in contact with the ruler (1) and a second section (2b), articulated on the previous one by means of a rotary shaft (26) that allows them to be aligned, as shown in FIGS. 1 and 2, or a variable angle forming therebetween, as shown in FIG. 4, to facilitate the fastening of the small ceramic parts.

Having sufficiently described the nature of the invention, in addition to an example of preferred embodiment, it is hereby stated for the relevant purposes that the materials, shape, size and layout of the described elements may be modified, provided that it does not imply altering the essential characteristics of the invention claimed below.

The invention claimed is:

1. A set square for manual ceramic cutters comprising: a ruler rotatably mounted and secured to a base of a manual ceramic cutter, defining various angles; a stop that is mounted on the ruler and can be moved longitudinally and a tightening element for securing the lateral stop to the ruler; wherein the cross-section of the ruler comprises two oblique planes that converge towards an intermediate surface provided with a longitudinal recess having a generally T-shaped cross section, for mounting the tightening element; the lateral stop comprises two oblique planes facing the ruler and having the same slope as the oblique planes of the ruler, and which converge towards an intermediate surface that has an opening to mount the tightening element, and wherein the intermediate surface of the lateral stop has a width smaller than the intermediate surface of the ruler, such that contact between the ruler and the lateral stop is established between the oblique planes of the ruler and the oblique planes of the lateral stop.

2. The set square according to claim 1, wherein the securing element comprises: a head that is housed and can be moved and not rotated in the longitudinal recess of the ruler; a threaded rod that passes through the hole of the lateral stop; and a tightening knob mounted on said threaded rod.

3. The set square according to claim 1, wherein one of the oblique planes of the ruler converges with a plane parallel to the shaft of the tightening element and is extended along the ruler; and one of the oblique planes of the stop converges with a plane that, in the securing position of the stop to the ruler, it is arranged in parallel and very close to the plane of the ruler, preventing the relative rotation thereof.

4. The set square according to claim 1, wherein the lateral stop has a first section that defines the oblique planes in contact with the ruler and a second section articulated on the first section by a rotary shaft.

* * * * *